United States Patent
Fuchs

(10) Patent No.: US 10,902,004 B2
(45) Date of Patent: Jan. 26, 2021

(54) PROCESSING USER-SUBMITTED UPDATES BASED ON USER RELIABILITY SCORES

(71) Applicant: salesforce.com, inc., San Francisco, CA (US)

(72) Inventor: Matthew Fuchs, Los Gatos, CA (US)

(73) Assignee: salesforce.com, inc., San Francisco, CA (US)

( * ) Notice: Subject to any disclaimer, the term of this patent is extended or adjusted under 35 U.S.C. 154(b) by 803 days.

(21) Appl. No.: 14/500,446

(22) Filed: Sep. 29, 2014

(65) Prior Publication Data

US 2015/0106390 A1 Apr. 16, 2015

Related U.S. Application Data

(60) Provisional application No. 61/891,619, filed on Oct. 16, 2013.

(51) Int. Cl.
*G06F 16/2457* (2019.01)
*G06F 16/23* (2019.01)

(52) U.S. Cl.
CPC ........ *G06F 16/24578* (2019.01); *G06F 16/23* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

OTHER PUBLICATIONS

U.S. Appl. No. 13/998,890.
U.S. Appl. No. 13/987,075.
U.S. Appl. No. 13/987,074.
U.S. Appl. No. 13/998,065.

(Continued)

*Primary Examiner* — Ashish Thomas
*Assistant Examiner* — Mellissa M. Ohba
(74) *Attorney, Agent, or Firm* — Dergosits & Noah LLP; Todd A. Noah

(57) ABSTRACT

Systems and methods for processing user-submitted updates based on user reliability scores. An update score is determined for an update submitted by a user based on a similarity of a field value provided by the update to corresponding field values in identified records. A user score is determined based on update scores, including the update score, determined for corresponding updates submitted by the user. The update is then processed based on the user score.

20 Claims, 4 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,346,839 B2 * | 3/2008 | Acharya ............ G06Q 30/0246 |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,822,631 B1 * | 10/2010 | Vander Mey ..... G06F 17/30038 |
| | | 705/7.29 |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,060,577 B1 * | 11/2011 | Conrad .................. G06F 21/56 |
| | | 709/206 |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,548,996 B2 * | 10/2013 | Tareen ................ G06F 17/3053 |
| | | 707/723 |
| 8,566,301 B2 | 10/2013 | Rueben et al. |
| 8,646,103 B2 | 2/2014 | Jakobson et al. |
| 8,793,255 B1 * | 7/2014 | Bilinski ............ G06F 17/30867 |
| | | 707/740 |
| 9,223,849 B1 * | 12/2015 | Bilinski ............ G06F 17/30867 |
| 2001/0044791 A1 | 11/2001 | Richter et al. |
| 2002/0046041 A1 * | 4/2002 | Lang ...................... G06Q 30/02 |
| | | 705/347 |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0198866 A1 * | 12/2002 | Kraft ................ G06F 17/30864 |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0236582 A1 * | 12/2003 | Zamir .................. G11B 27/002 |
| | | 700/94 |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2010/0115040 A1 * | 5/2010 | Sargent .................. G06Q 10/10 |
| | | 709/206 |
| 2010/0198836 A1 * | 8/2010 | Glass ...................... G06Q 30/02 |
| | | 707/748 |
| 2012/0233137 A1 | 9/2012 | Jakobson et al. |
| 2012/0284090 A1 * | 11/2012 | Marins ............... G06Q 10/0631 |
| | | 705/7.39 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0275884 A1 * | 10/2013 | Katragadda ........... H04L 65/403 |
| | | 715/753 |
| 2014/0229407 A1 * | 8/2014 | White .................. G06N 99/005 |
| | | 706/12 |
| 2015/0142767 A1 * | 5/2015 | Wu ........................ G06F 16/951 |
| | | 707/706 |
| 2016/0140355 A1 * | 5/2016 | Jagota ................. G06F 21/6218 |
| | | 707/785 |

OTHER PUBLICATIONS

U.S. Appl. No. 13/986,744.

U.S. Appl. No. 13/986,251.

\* cited by examiner

200

| User Reliability Score | 1st Update Score | 2nd Update Score | 3rd Update Score | 4th Update Score | 5th Update Score | 6th Update Score |
|---|---|---|---|---|---|---|
| | | | | | | |

FIG. 2

PROCESSING USER-SUBMITTED UPDATES BASED ON USER RELIABILITY SCORES

CLAIM OF PRIORITY

This application claims the benefit of U.S. Provisional Patent Application No. 61/891,619 entitled, SYSTEM AND METHOD FOR PROCESSING USER UPDATES BASED ON USER RELIABILITY SCORES, by Matthew Fuchs, filed Oct. 16, 2013, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Crowd-sourced database system users can update a database by creating, modifying, or deleting data, such as business contacts. However, not all user-submitted updates are equally reliable because some users' updates can create bad data that can pollute the database. Therefore, a database system may need to assess the likely reliability of a user-submitted update to determine whether or not to apply the user-submitted update to the database. However, a database system may have very little information about many of the users updating data, and a significant amount of time may pass before the database system can definitively determine whether a user-submitted update created bad data in the database.

BRIEF SUMMARY

In accordance with embodiments, there are provided systems and methods for processing user-submitted updates based on user reliability scores. An update score is calculated, for an update submitted by a user, based on similarity of a field value provided by the update to corresponding field values in identified records. A user score is calculated based on update scores, including the update score, calculated for corresponding updates submitted by the user. The update is processed based on the user score.

For example, a system calculates a update reliability score for an update submitted by a user for street address field in a business contact record based on how similar the submitted street address is to the distribution of values for street address fields included in inactive business contact records, and how similar the submitted street address is to the distribution of values for street address fields included in active business contact records. The system accumulates all of the update reliability scores for the user, and divides the accumulation of the updates reliability scores by the number of updates submitted by the user to calculate the user's reliability score. If the database system calculates a user reliability score that is lower than a rejection threshold, the database system rejects the update submitted by the user for the address field in the business contact record.

While one or more implementations and techniques are described with reference to an embodiment in which processing user-submitted updates based on user reliability scores is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 2 is a block diagram of an example data structure for update scores and a user reliability score for processing user-submitted updates based on user reliability scores, in an embodiment;

DETAILED DESCRIPTION

General Overview

Systems and methods are provided for processing user-submitted updates based on user reliability scores. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, mechanisms and methods for processing user-submitted updates based on user reliability scores will be described with reference to example embodiments. The following detailed description will first describe a method for processing user-submitted updates based on user reliability scores. Next, a block diagram of a data structure for processing user-submitted updates based on user reliability scores is described.

Figure 1:
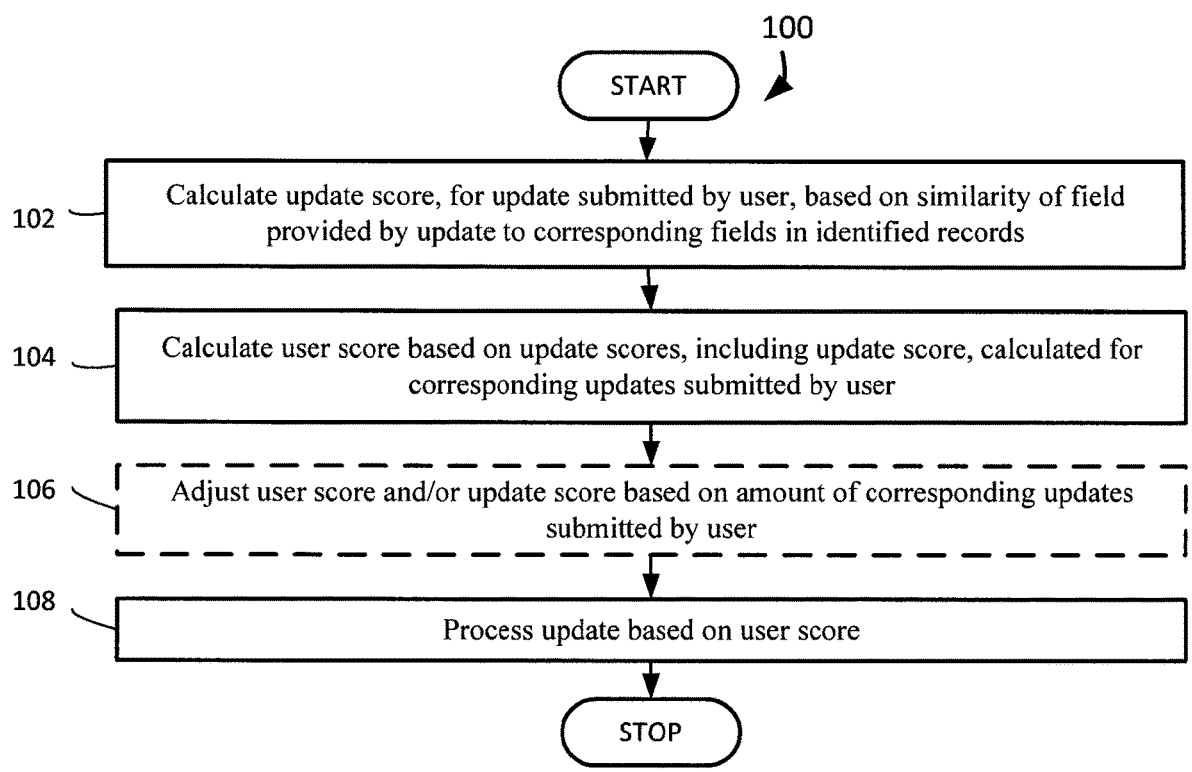
FIG. 1 is an operational flow diagram illustrating a high level overview of a method for processing user-submitted updates based on user reliability scores, in an embodiment.

FIG. 1 is an operational flow diagram illustrating a high level overview of a method 100 for processing user-submitted updates based on user reliability scores. As shown in FIG. 1, a database system may process user-submitted updates based on user reliability scores.

A database system calculates an update score for an update submitted by a user based on similarity of a field value provided by the update to corresponding field values in identified records, block 102. For example and without limitation, this can include the database system calculating a update reliability score for an update submitted by a user for the street address field in a business contact record based on how similar the submitted street address is to the distribution of values for street address fields included in bad business contact records, and how similar the submitted street address is to the distribution of values for street address fields included in good business contact records. A block diagram of an example data structure for update reliability scores and a user reliability score for processing user-submitted updates based on user reliability scores is depicted in FIG. 2 and described below in the description of FIG. 2. The database system evaluates updates submitted by a user based on how the submitted update appears when compared to previous user-submitted updates of known quality.

The database system identifies some data records as good data records and identifies other data records as bad data records to enable the comparison of a user-submitted update to user updates of known reliability. For example, most of the business contact records that were purchased by system users are active records which can be considered as good data records produced by reliable user updates because a purchasing user is likely to complain to a system administrator if a business contact record includes bad data. In another example, most of the business contact records that were inactivated by the database system can be considered as bad data records produced by unreliable user updates because most of the business contact records were inactivated, or grave-yarded, by the database system due to the identification of bad data in the business contact records. The database system can immediately evaluate some user-submitted updates as bad, such as when a user-submitted update adds unnecessary punctuation.

For each record, the database system may then use the field value reliability scores for the record's field values to calculate the likelihood that the record is a good data record based on the record's similarity to good data records, such as purchased business contact records. Likewise, the database system may then use the field value reliability scores for the record's field values to calculate the likelihood that the record is a bad data record based on the record's similarity to bad data records, such as grave-yarded business contact records. For each record, the database system may combine the likelihood that a record includes good data with the likelihood that the record includes bad data to calculate a record reliability score for updates submitted to the record.

A user-submitted update either creates, modifies, or deletes data in a data record's fields, such as the first name, the last name, the company name, and the industry for a business contact. The database system may generate a set of features for a record's fields and evaluate some field values, by evaluating the corresponding features, independent of other field values in the same record, as a field value may depend on one or more field values in the same record. For example, a good data record is more likely than a bad data record to have the area code for a business contact's phone number belonging to the city of the business contact's street address, but this likelihood derives from the fact that the area code and the city are not independent of each other. Most of the features are the same as their corresponding field values. However, a feature may combine data from multiple field values, such as a feature that takes the first name, last name, and email address, and returns an identifier for a pattern, if any, indicated by the email address. A record may also have field values which the database system does not use for features.

The database system may use a naïve Bayes model, which assumes that all field values in the same data record are independent of each other, to evaluate the reliability of the user-submitted updates to field values based on a comparison to previous user-submitted updates to field values of known good or bad data records. The database system may improve the reliability evaluations by storing additional about the data records, such as information stored in tables which identify area code/city consistency and email format consistency with the domain, or information that indicates whether a field value, such as title, has been added by many users or added by just a few users. The database system may take a sample of existing records over a time period, such as the last two years, that matches the database system's current distribution of good data records and bad data records. For each field value in each record, the database system may calculate the conditional probability that the field value includes good data, producing a reliability score for each field value in each record.

Having calculated the update score, the database system calculates a user score based on update scores, including the update score, calculated for corresponding updates submitted by the user, block 104. By way of example and without limitation, this can include the database system accumulating all of the update reliability scores for the user, and dividing the accumulation of the update reliability scores by the number of updates submitted by the user to calculate the user's reliability score. A block diagram of an example data structure for update scores and a user reliability score for processing user-submitted updates based on user reliability scores is depicted in FIG. 2 and described below in the description of FIG. 2. In addition, some of the user's updates will be eventually evaluated by other users, such as when business contact records are purchased (corresponding updates evaluated as completely reliable) or grave-yarded (corresponding updates evaluated as completely unreliable). Egregiously bad updates, such as user-submitted updates that add unnecessary punctuation, are always evaluated as completely unreliable. In this way, the user reliability score improves over time. The database system may maintain a user reliability score between 0 and 1 by averaging all user updates over time. The database system can use the user reliability score to evaluate the reliability of new user-submitted updates from the evaluated user.

After calculating the user score, the database system optionally adjusts the update score and/or the user score based on the amount of corresponding updates submitted by the user, block 106. In embodiments, this can include the database system adjusting the update reliability score and/or the user reliability score to account for the number of updates that a user has submitted, such that an initial reliable update does not carry too much weight in calculating the update reliability score and/or the user reliability score. The database system may use a logistic function based on the number of user updates, which discounts new user reliability scores without growing out of bounds as the number of user-submitted updates grows large. The system may use a logistic function like the following, where r is the user reliability score, u is the update reliability score, n is the number of submissions, and f is the logistic function:

$$u(1+r*f(n))/2,$$

where r*f(n−1) varies between 0 and 1, and r is initially 0.

Given a score that varies between 0 and 1, this logistic function becomes larger as the user reliability score becomes larger, thereby boosting or lowering the evaluation of the update reliability score. Although an example of a specific logistic function is described, another method may be used to adjust the user reliability score or the update reliability score based on the amount of corresponding updates submitted by the user.

After calculating and possibly adjusting the user score, the database system processes the update based on the user score, block 108. For example and without limitation, this can include the database system calculating a user reliability score that is lower than a rejection threshold and rejecting the update submitted by the user for the address field in the business contact record. In another example, the database system calculates a user reliability score that is higher than an acceptance threshold and accepts the update submitted by the user for the address field in the business contact record. In yet another example, the database system calculates a user reliability score that is higher than the rejection threshold, but lower than the acceptance threshold, and forwards the update submitted by the user for the address field in the business contact record for further evaluation by a system administrator. The thresholds may vary, depending on the importance of the record being updated, such that the database system may user a higher acceptance threshold for business contact records which are frequently purchased.

Processing the update based on the user score may be further based on the update score. For example, although a reliable-appearing update submitted for a record by a reliable user may be accepted, a reliable-appearing update submitted for a record by an unreliable user may be accepted, rejected, or further evaluated based on the relationship between the update score and the user reliability score, along with any corresponding thresholds. In another example, although an unreliable-appearing update submitted for a record by an unreliable user may be rejected, an unreliable-appearing update from a normally reliable user may be rejected, accepted, or further evaluated based on the relationship between the update score and the user reliability score, along with any corresponding thresholds.

The method 100 may be repeated as desired. Although this disclosure describes the blocks 102-108 executing in a particular order, the blocks 102-108 may be executed in a different order. In other implementations, each of the blocks 102-108 may also be executed in combination with other blocks and/or some blocks may be divided into a different set of blocks.

FIG. 2 illustrates a block diagram of an example data structure 200 for update scores and a user reliability score for processing user-submitted updates based on user reliability scores, under an embodiment. The data structure 200 includes six update reliability scores calculated by the database system for the six updates submitted by a user, and also includes a user reliability score, which the database system calculated as the average of the six update scores. As mentioned above in reference to block 106, the database system may adjust the user reliability score and/or the update reliability scores based on the number of updates submitted by the user.

System Overview

Figure 3:
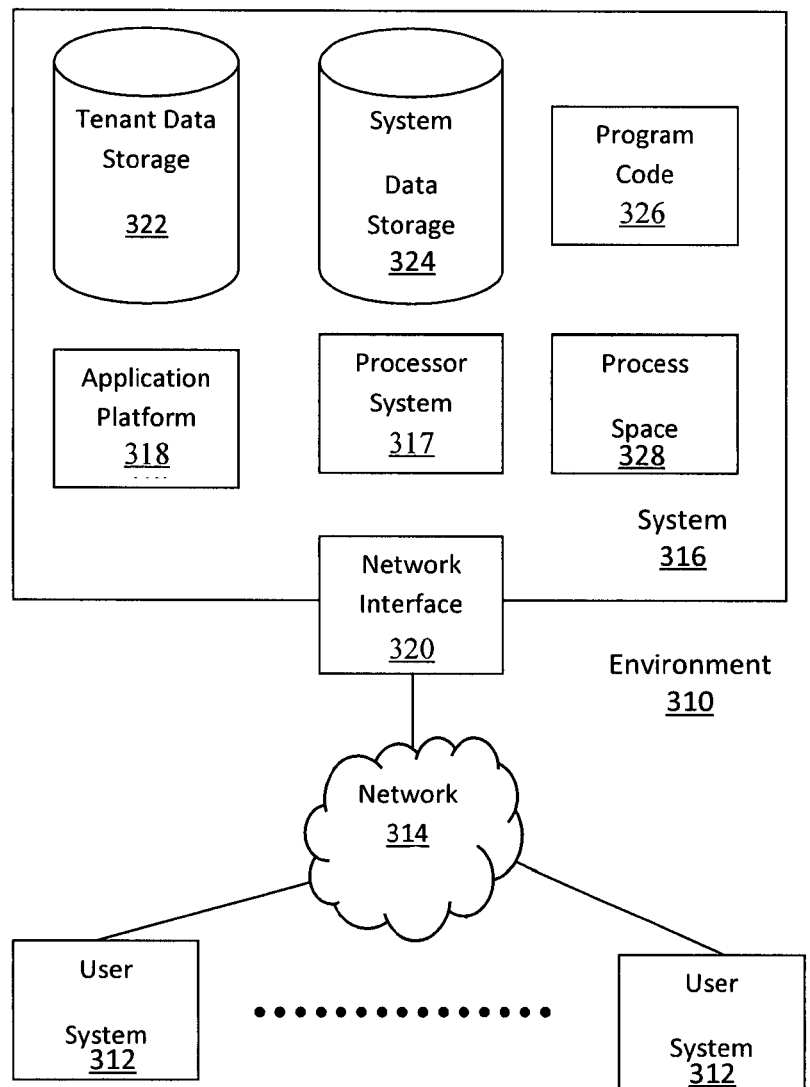
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared.

In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein.

Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known.

It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
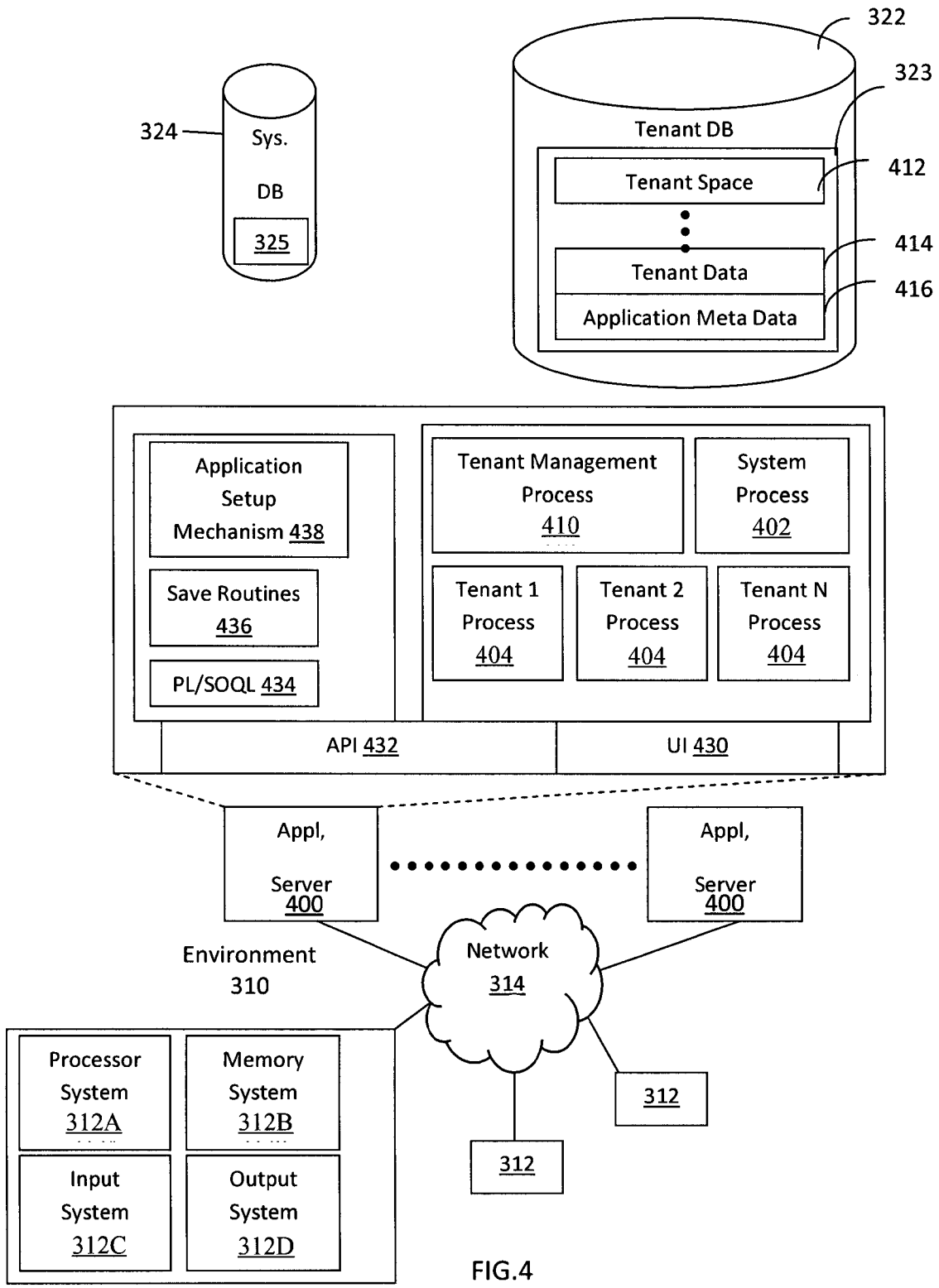
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks.

As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for processing user-submitted updates based on user reliability scores, the apparatus comprising:
   one or more processors; and
   a non-transitory computer readable medium storing a plurality of instructions, which when executed, cause the one or more processors to:
      determine a record field update score for a record field update submitted by a user for a record having a plurality of fields, the record field update score being determined based on a database system calculating a likelihood of a similarity of a field value provided by the record field update compared against all of a plurality of corresponding field values in a plurality of previously identified records in the database system;

determine a user score based on a plurality of record field update scores, the user score comprising an accumulation of record field update scores, which are determined for a plurality of corresponding record field updates submitted by the user, divided by a total number of the plurality of corresponding record field updates submitted by the user; and process the record field update to the record based on the user score.

2. The system of claim 1, wherein the record field update comprises one of a field value creation, a field value modification, and a field value deletion.

3. The system of claim 1, wherein the plurality of previously identified records in the database system is one of a plurality of active records and a plurality of inactive records.

4. The system of claim 1, wherein processing the record field update to the record based on the user score is further based on accepting the record field update to the record, in response to a determination that the user score is greater than a first threshold, and also in response to a determination that the record field update score is greater than a record field update score threshold, the system comprises further instructions, which when executed, cause the one or more processors to reject the record field update in response to a determination that the user score is less than a second threshold and forward the record field update for evaluation in response to a determination that the user score is between the first threshold and the second threshold.

5. The system of claim 1, comprising further instructions, which when executed, cause the one or more processors to adjust at least one of the record field update score and the user score based on an amount of the plurality of corresponding record field updates submitted by the user.

6. A computer program product comprising a non-transitory computer-readable medium having computer-readable program code embodied therein to be executed by one or more processors, the program code including instructions to:

determine a record field update score for a record field update submitted by a user for a record having a plurality of fields, the record field update score being determined based on a database system calculating a likelihood of a similarity of a field value provided by the record field update compared against all of a plurality of corresponding field values in a plurality of previously identified records in the database system;

determine a user score based on a plurality of record field update scores, the user score comprising an accumulation of record field update scores, which are determined for a plurality of corresponding record field updates submitted by the user, divided by a total number of the plurality of corresponding record field updates submitted by the user; and process the record field update to the record based on the user score.

7. The computer program product of claim 6, wherein the record field update comprises one of a field value creation, a field value modification, and a field value deletion.

8. The computer program product of claim 6, wherein the plurality of previously identified records in the database system is one of a plurality of active records and a plurality of inactive records.

9. The computer program product of claim 6, wherein processing the record field update to the record based on the user score is further based on accepting the record field update to the record, in response to a determination that the user score is greater than a first threshold, and also in response to a determination that the record field update score is greater than a record field update score threshold, the program code comprises further instructions to reject the record field update in response to a determination that the user score is less than a second threshold and forward the record field update for evaluation in response to a determination that the user score is between the first threshold and the second threshold.

10. The computer program product of claim 6, wherein the program code comprises further instructions to adjust at least one of the record field update score and the user score based on an amount of the plurality of corresponding record field updates submitted by the user.

11. A method for processing user-submitted updates based on user reliability scores, the method comprising:

determining a record field update score for a record field update submitted by a user for a record having a plurality of fields, the record field update score being determined based on a database system calculating a likelihood of a similarity of a field value provided by the record field update compared against all of a plurality of corresponding field values in a plurality of previously identified records in the database system;

determining a user score based on a plurality of record field update scores, the user score comprising an accumulation of record field update scores, which are determined for a plurality of corresponding record field updates submitted by the user, divided by a total number of the plurality of corresponding record field updates submitted by the user; and processing the record field update to the record based on the user score.

12. The method of claim 11, wherein the record field update comprises one of a field value creation, a field value modification, and a field value deletion.

13. The method of claim 11, wherein the plurality of previously identified records in the database system is one of a plurality of active records and a plurality of inactive records.

14. The method of claim 11, wherein processing the record field update to the record based on the user score is further based on accepting the record field update to the record, in response to a determination that the user score is greater than a first threshold, and also in response to a determination that the record field update score is greater than a record field update score threshold, the method further comprising rejecting the record field update in response to a determination that the user score is less than a second threshold and forwarding the record field update for evaluation in response to a determination that the user score is between the first threshold and the second threshold.

15. The method of claim 11, the method further comprising adjusting at least one of the record field update score and the user score based on an amount of the plurality of corresponding record field updates submitted by the user.

16. A system for processing user-submitted updates based on user reliability scores, the system comprising:

one or more processors; and a non-transitory computer readable medium storing a plurality of instructions, which when executed, cause the one or more processors to:

determine a record field update score for a record field update submitted by a user for a record having a plurality of fields, the record field update score being determined based on a database system calculating a likelihood of a similarity of a field value provided by the record field update compared against all of a plurality of corresponding field values in a plurality of previously identified records in the database system;

determine a user score based on a plurality of record field update scores, the user score comprising an accumulation of record field update scores, which are determined for a plurality of corresponding record field updates submitted by the user, divided by a total number of the plurality of corresponding record field updates submitted by the user;

determine whether the user score is greater than a first threshold; and accept the record field update to the record, in response to a determination that the user score is greater than the first threshold.

17. The system of claim 16, wherein the record field update comprises one of a field value creation, a field value modification, and a field value deletion.

18. The system of claim 16, wherein the plurality of previously identified records in the database system is one of a plurality of active records and a plurality of inactive records.

19. The system of claim 16, wherein accepting the record field update to the record, in response to a determination that the user score is greater than the first threshold, is also in response to a determination that the record field update score is greater than a record field update score threshold, the processor-based application, which when executed on the computer, will cause the processor to reject the record field update in response to a determination that the user score is less than a second threshold and forward the record field update for evaluation in response to a determination that the user score is between the first threshold and the second threshold.

20. The system of claim 16, the processor-based application, which when executed on the computer, will cause the processor to adjust at least one of the record field update score and the user score based on an amount of the plurality of corresponding record field updates submitted by the user.

* * * * *